United States Patent

[11] 3,587,628

[72] Inventors Sydney Farrer
    Sheffield;
    Ernest Edward Doe, Chesterfield, England
[21] Appl. No. 804,749
[22] Filed Mar. 6, 1969
[45] Patented June 28, 1971
[73] Assignee The Bryan Donkin Company Limited
    Chesterfield, England
[32] Priority Mar. 11, 1968, June 4, 1968
[33] Great Britain
[31] 11818/68 and 26654/68

[54] GAS PRESSURE REGULATORS
    6 Claims, 2 Drawing Figs.
[52] U.S. Cl. .................................. 137/456,
    137/458, 137/460, 137/504
[51] Int. Cl. ........................................ F16k 17/64
[50] Field of Search............................ 137/458,
    463, 408, 434.4, 484.8, 505.26, 504, 484.2, 470

[56] References Cited
UNITED STATES PATENTS

| | | | |
|---|---|---|---|
| 2,581,071 | 1/1952 | Born.............................. | 137/458 |
| 2,698,026 | 12/1954 | Roberts.......................... | 137/458 |
| 2,826,213 | 3/1958 | Wright ........................... | 137/484.4X |
| 2,827,069 | 3/1958 | Peterson........................ | 137/505.46X |
| 2,865,397 | 12/1958 | Chenault........................ | 137/504 |
| 3,251,376 | 5/1966 | Worden.......................... | 137/505.26X |
| 3,386,465 | 6/1968 | Johnson ........................ | 137/463 |

Primary Examiner—Harold W. Weakley
Attorney—Jacobs and Jacobs

ABSTRACT: A gas pressure regulator having a regulator valve controlled by a flexible diaphragm acted upon by gas pressure in a gas chamber which communicates with an outlet chamber of the regulator, and having also a cutoff valve which is caused to close when the flow of gas from the outlet chamber to the gas chamber exceeds a predetermined rate on leakage of the flexible diaphragm.

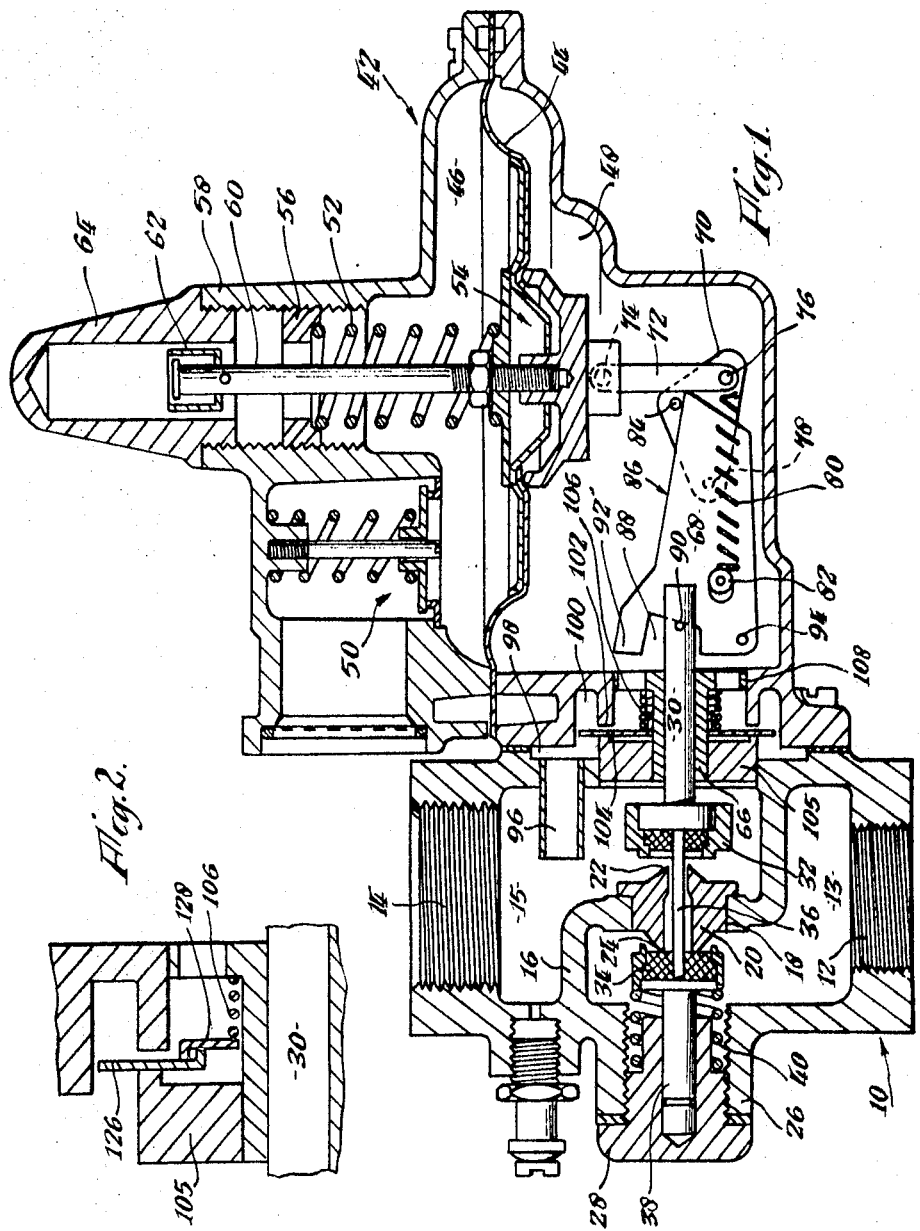

GAS PRESSURE REGULATORS

This invention relates to gas pressure regulators such as are used for example, though not exclusively, in gas supply installations, and has for its object to provide improvements therein.

More particularly the invention relates to pressure regulators which include a gas inlet, a gas outlet, a regulator valve disposed between the inlet and the outlet and having a closure member and an orifice closable thereby, control mechanism wherein a flexible diaphragm divides a casing into two chambers namely a vented chamber vented to atmosphere and a gas chamber to receive gas under pressure, the flexible diaphragm being movable by the gas pressure in the outlet acting against a yieldable force (usually the force of a spring), and a connection including an operating spindle between the diaphragm and the regulator valve closure member, the arrangement being such that over a range of pressures the connection causes or permits opening movement of the regulator valve upon decrease in gas pressure and closing movement upon increase in gas pressure; such regulators are generally referred to in this specification as being "of the kind specified."

The invention provides a gas pressure regulator of the kind specified, which also includes a cutoff valve having a closure member and an orifice closable thereby, the cutoff valve being disposed upstream both of the gas outlet and of the gas chamber, and flow responsive means arranged between the gas outlet and the gas chamber to cause the cutoff valve to be closed when flow of gas into the gas chamber exceeds a predetermined rate. During normal operation of the regulator, flow of gas into and back out of the gas chamber is very slight, taking place upon variations in pressure accompanied by movement of the diaphragm. But if it should happen that the diaphragm becomes damaged and develops leak the flow into the gas chamber could become substantial and a regulator embodying the invention would then automatically shut off. Also, in regulators in which the diaphragm itself includes a pressure relief valve, upon leakage through the pressure relief valve becoming substantial, a regulator embodying the invention would automatically shut off.

Preferably, the cutoff valve is disposed upstream of the regulator valve and their respective closure members are preferably mounted coaxially upon a common operating spindle connected to the control mechanism.

The flow responsive means may be arranged so that when the flow of gas into the gas chamber exceeds the predetermined rate, communication between the outlet and the gas chamber is cut off entirely so that, as gas continues to leak through the damaged diaphragm, a "low pressure cutoff" is brought about.

In addition to the flow responsive means there may be disposed between the gas outlet and the gas chamber a pressure responsive valve means responsive to a pressure somewhat greater than the pressure at which "high pressure cutoff" is brought about, the arrangement being such that when the rate of flow of gas into the gas chamber exceeds the predetermined rate, communication between the outlet and the gas chamber is initially cutoff entirely so that, as gas continues to leak through the damaged diaphragm, the pressure in the gas outlet is initially increased, followed by the opening of the pressure responsive valve means so that gas at the pressure in the gas outlet is then admitted to the gas chamber at an unrestricted rate to cause a "high pressure cutoff" to be effected. In this case, the pressure responsive valve means may have the characteristics of a differential valve in that when the valve has been opened by a pressure of gas in the gas outlet it presents a greater area to said pressure of gas than when it is closed, and preferably the flow responsive means and the pressure responsive means are constituted by respective valve members which engage one upon the other. Said valve members will preferably be of annular form and will encircle a bush through which the operating spindle between the diaphragm and the regulator valve closure member extends.

The invention may with great advantage be used in conjunction with that described in our copending application Ser. No. 783,652. Thus the connection between the diaphragm and the operating spindle preferably includes a spring loaded linkage able to "break" the connection by means of an overcenter trip action of the linkage when the gas pressure acting against the diaphragm exceeds a predetermined upper limit, the arrangement being such that upon tripping of the linkage, the cutoff closure member is moved to close the cutoff orifice. The expression "tripped" refers to the position which the parts of the linkage assume when the connection has been "broken" and the expression "normal" denotes the condition when the linkage has not tripped. The expression "broken" denotes that the relative positions of the component parts of the connection has changed so that it yields or causes reversal of movement. In the result, when the connection has been "broken" the regulator shuts off automatically.

In order that the invention may be fully understood and readily carried into effect, the same will now be described, by way of example only, with reference to the accompanying drawings, of which:

FIG. 1 is a sectional view of a gas pressure regulator embodying the invention,

FIG. 2 is a scrap view which will be referred to presently in connection with further possible modifications which may be made.

Referring now to FIG. 1 there is shown a gas pressure regulator which includes a valve chamber 10 having a gas inlet 12 in communication with an inlet chamber 13, and a gas outlet 14 in communication with an outlet chamber 15. The inlet chamber and the outlet chamber are separated by a wall 16 provided with an aperture 18 fitted with an insert 20. The insert has a bore forming a regulator orifice 22 and a slightly larger counterbore forming a cutoff orifice 24. The chamber at its end 26 is closed by a plug 28. A valve spindle 30 carries coaxially a regulator closure member 32 and a cutoff closure member 34. A reduced section 36 of the spindle passes with clearance through the inset 20 and one end 38 is slidably supported in a blind hole in the plug. A spring 40 urges the cutoff closure member 34 towards its orifice.

A control mechanism casing 42 accommodates a diaphragm 44 which divides the interior of the casing into a vented chamber 46 and a gas chamber 48. The gas chamber normally communicates with the outlet chamber 15 of the valve casing. The vented chamber on the other hand is vented to atmosphere via a conventional spring-loaded vent valve 50. A spring 52 bears upon a stiffener 54 of the diaphragm and its setting is adjustable by a setting nut 56 screw-threaded in a housing 58. A resetting rod 60 extends from the stiffener up the housing and carries a knob 62. The housing is closed by a screwcap 64.

The valve spindle 30 extends through a bush 66 into the gas chamber and is connected to the diaphragm by a linkage which includes an operating lever 68, a trip lever 70 and a link 72. Link 72 is pivotally secured by pivot 74 to diaphragm stiffener 54 and to trip lever 70 by pivot 76. Trip lever 70 is secured by pivot 78 to operating lever 68. A tension spring 80 is anchored to trip lever 70 at the pivot 76 and to the operating lever 68 by a pin 82. The linkage is shown in its normal position; the line joining the anchorages of tension spring 80 is below pivot 78 of the trip lever, and thus the spring tends to turn the trip lever clockwise about pivot 78 so that a pin 84 projecting from the trip lever abuts against an upper edge 86 of the operating lever. The end of the operating lever remote from the trip lever bears against valve operating spindle 30 by interengagement of a mouth portion 88 thereof with a pin 90 formed on the spindle. An abutment head 92 formed on the operating lever abuts against a wall of the gas chamber to limit movement of the lever if and when the facing of the regulator closure member 32 has become damaged. The operating lever is fulcrummed at pivot 94 a short distance below the mouth but remote from the trip lever and thus affords mechanical advantage when lifted by the trip lever.

Operation of the mechanism so far described is as follows:

During normal operation, pressure of gas in the gas chamber urges the diaphragm upwards against the force of the spring 52. Link 72 tends to lift trip lever 70. Tension spring 80 tends to hold pin 84 against the upper edge of the operating lever, and trip lever and operating lever move as one. Lifting of the link in response to increasing pressure in the gas chamber pivots the operating lever about 94, its mouth 88 moves pin 90 and thus the operating spindle against the force of the spring 40, and regulator valve closure member 32 is moved towards its seat (the cutoff valve closure member 34 is already off its seat of course). Variations in pressure in the outlet chamber are transmitted to the gas chamber as will presently be described and the control mechanism adjusts the position of the regulator appropriately.

If the pressure in the outlet 14 falls excessively, the pressure in the gas chamber falls in like manner, the diaphragm is moved downwards by spring 52, link 72 moves the trip lever 70 downwards, pin 84 presses on the operating lever which turns about 94, and the valve spindle, having already fully opened the regulator closure member 32, moves still further to close the cutoff valve 34. The cutoff valve member 34 continues to be held shut on its seat by the spring 40. The cutoff valve, it will be observed, is upstream of the gas outlet end of the regulator valve so that after low pressure cutoff it needs to be reopened manually by removing the screwcap 64 and lifting the knob 62.

If on the other hand the pressure in the outlet chamber becomes excessive, e.g. by reason of wear of the regulator closure member, the diaphragm is moved upwards against the force of the spring 52 and when the limit of movement of the operating lever about 94 has been reached (e.g. by abutment of regulator valve member 32 against its seat or of the head 92 of the operating lever 68 against the wall of the gas chamber), further upward movement of the link makes the trip lever pivot about 78 relative to the operating lever, the tension spring 84 is extended and when the line joining pivots 76 and 82 crosses over to the other side of pivot 78, the trip lever swings round by an overcenter trip action and thus "breaks" the linkage and the connection to the valve spindle. The operating lever 68 thus turns clockwise about pivot 94, and the cutoff valve closure member 34 is urged upon its seat, by the spring 40 with a snap action.

The regulator can in this case also be reset by pulling on the knob 62 (after removal of the cover 64); this opens the cutoff valve and readmits gas to the outlet chamber and hence to the gas chamber. However, since the regulator was made to cut off by reason of excessive pressure which caused the linkage to be broken, the knob (before being lifted) must be pressed down to "remake" the linkage by reversal of the overcenter snap action.

The outlet chamber 15 of the valve casing is in communication with the gas chamber 48 of the diaphragm casing by way of a stub pipe 96 extending through a wall of the valve casing into an annular space 98 leading into a pocket 100. The pocket is bounded by an annular member constituting a seating 102 for an obturator. The obturator is in the form of a disc 104 which rides on the bush 66 and is urged away from seating 102 onto a back support 105 by a spring 106 which reacts against an apertured flange 108 of the bush. In normal operation, communication is effected via stub pipe 96, annular space 98 past the peripheral edge of the disc 104 into pocket 100, between the seat 102 and the disc, and through the apertures in the flange 108. The space between the peripheral edge of the disc and the wall of the passage in which the disc is disposed constitutes a restricted opening to the gas chamber. If the diaphragm becomes damaged and develops a leak, gas will pass from the outlet chamber to the gas chamber, through the diaphragm and via the vent valve out to atmosphere. By reason of the restricted opening referred to, the pressure on the rear of the disc (i.e. the pressure in the gas chamber) will be less than that on the face of the disc (i.e. upstream of the gas chamber) and this pressure differential will tend to move the disc away from its back support towards its seat against the force of the spring. Once the rate of flow is such that the pressure differential across the obturator is sufficient to start to move the disc away from its back support, the clearance between the rear of the disc and its seat 102 is reduced, thereby reducing still further the access of gas to the gas chamber. Consequently, the pressure in the gas chamber drops further (since gas is of course still leaking through the damaged diaphragm) and the increasing pressure differential causes the disc to snap onto its seat. Thereupon lack of gas pressure in the gas chamber causes the closure member 34 to shut off the gas supply as for low pressure cutoff, although during the process the regulator passes through the fully open condition which inevitably increases the outlet chamber pressure momentarily. In other words, in the event of diaphragm failure the regulator behaves as though there is a dangerously low pressure in the outlet chamber 15 and low pressure cutoff or trip is effected.

During normal operation there is slight flow into the gas chamber and back from it into the outlet chamber, to accommodate variations of pressure and movement of the diaphragm. The presence of the restricted opening between the two chambers has a cushioning effect and prevents sudden variations in the outlet chamber from being immediately transmitted to the gas chamber which might have resulted in unintentional cutoff of the supply. The use of a stub pipe 96 greatly reduces the risk of passage of dust, and such little dust as passes through it can settle at the back of the pocket 100 and at the bottom of the annular space 98. The relative dimensions of the disc and of the clearances and the strength of the spring will depend upon the size of the regulator and upon the operating pressures involved, and will not present any difficulty to designers skilled in the field of technology.

Referring now to FIG. 2 in a further modification of the regulator previously described with reference to FIG. 1, there is provided an obturator which it is thought will combine the advantages of the "low pressure trip" and "high pressure trip" arrangements previously described. In this modification, the disc 104 has been replaced by a pair of annular valve members 126 and 128 which engage one upon the other as shown and which constitute respectively flow responsive means and pressure responsive means. The spring 106 acts against the member 128 which in turn acts against the member 126 and in normal circumstances the latter seats against the back support 105. As in the regulator illustrated in FIG. 1, the space between the peripheral edge of the member 126 and the wall of the passage in which it is disposed constitutes a restricted opening to the gas chamber and by reason of this a leakage of gas from the gas chamber resulting from damage to the diaphragm will produce a pressure differential across the obturator. Once the rate of flow is such that this pressure differential is sufficient to start to move the member 126 away from its back support, the clearance between it and the seat 102 is reduced to restrict still further the flow of gas to the gas chamber. Consequently, the member 126 snaps shut against said seat and the pressure of gas in the gas chamber starts to fall (by virtue of the leakage through the diaphragm). There is therefore a false response of the regulator in that the closure member 32 is initially opened to allow the pressure in the outlet chamber to increase. However, before the said closure member has moved relatively slowly through its fully open position to be followed by a simulated "low pressure trip" the pressure of gas acting against the valve member 128 is able to unseat the latter, against the force of the spring, from engagement with the valve member 126. Having been unseated, the valve member 128 presents a greater area to the pressure of gas in the outlet chamber 15 than when it acts against the member 126. Consequently, it snaps open in the manner of a differential valve after a short interval of time during which the pressure in the outlet chamber has increased to some predetermined pressure somewhat in excess of that at which the normal "high pressure trip" occurs.

Thus it will be seen that a certain rate of leakage of gas through a damaged diaphragm beings about a high pressure condition in the outlet chamber 15 (not a dangerously high pressure of course, merely a pressure somewhat in excess of the pressure at which a high-pressure trip is normally brought about). Since this is initiated by a flow responsive device which is self-exciting, as previously described, it can be arranged to occur suddenly and decisively at a particular rate of flow only slightly greater than the rates of flow to and from the gas chamber which bring about control of the regulator during normal operation. Furthermore, since the trip action which is brought about is a "high pressure trip," and occurs with a snap action, brought about in direct response to a predetermined pressure, it can be arranged to occur at a particular and predetermined pressure and does not necessitate the closure member moving relatively slowly through the wide open position which would allow the pressure in the outlet chamber to soar even though only momentarily. On the contrary, before a dangerously high pressure can build up in the outlet chamber the cutoff valve is caused to snap shut.

It has been found that it has been possible to produce a regulator embodying the invention which shuts off in response to very small rates of diaphragm leakage, and although diaphragm failure is very rare it is a possibility, even when the diaphragm is made of the best available materials. It can obviously have very serious consequences. However, by virtue of its simple and robust construction and its reliability after long service, it is thought that a regulator embodying the invention might possibly be installed in a domestic gas supply system without provision for piping leakage out of doors, particularly since it can be designed to shut off in response to very small and therefore harmless rates of leakage or certainly with invent pipe much smaller than usual. A regulator embodying the invention has been found to give results never previously achieved.

It will, of course, be appreciated that many other modifications may be made without departing from the scope of the invention. Thus, for example, the trip lever could be omitted, the link 72 pivoted directly to the operating lever and some other means provided to shut off the valve in the event of excessive pressure in the gas chamber (whether caused by excessive pressure in the outlet or resulting from diaphragm failure). Furthermore, it will be understood that the regulator valve closure member and the shutoff valve closure member need not necessarily be mounted on a common spindle or indeed mounted coaxially. Similarly the obturator need not be of annular form surrounding the bush through which the control spindle extends. It could for example be positioned to one side of the spindle. It will also be understood that in the case of a pressure regulator having an obturator in the form of a pair of valve members these need not necessarily engage one upon the other. For example, the flow responsive valve member could be in the form of an annular member and encircle the bush through which the control spindle extends, much in the same way as that illustrated in FIG. 1, while the pressure responsive valve member could be positioned to one side of the spindle. The operation of the device would, however, be much the same as previously described.

We claim:

1. A gas pressure regulator comprising a gas inlet; a gas outlet; a regulator valve disposed between the inlet and the outlet; a gas chamber; access between the gas outlet and the gas chamber controlled by a normally open flow responsive means; a flexible diaphragm normally acted upon by pressure of gas in the gas outlet communicating to the gas chamber through the open flow responsive means; a spring acting on the diaphragm in opposition to the pressure of gas in said gas chamber; an operating spindle connected to the diaphragm for controlling the regulator valve; a cutoff valve disposed upstream both of the gas outlet and of the gas chamber; means operatively linking the cutoff valve and the diaphragm; and the normally open flow responsive means being disposed between the gas outlet and the gas chamber and operative to close in response to a flow of gas into the gas chamber exceeding a predetermined rate due to diaphragm failure and resulting in a predetermined pressure differential across said flow responsive means, whereby, when said normally open flow responsive means have closed, said flexible diaphragm is no longer acted upon by the pressure of gas in the gas outlet and effects closure of the cutoff valve.

2. A gas pressure regulator according to claim 1, wherein the cutoff valve is disposed upstream of the regulator valve.

3. A gas pressure regulator according to claim 2, wherein said means operatively linking the cutoff valve and the diaphragm is provided by said operating spindle.

4. A gas pressure regulator according to claim 3, wherein the flow responsive means include an obturator in the form of a disc rendered responsive to the flow between the gas outlet and the gas chamber by having a pressure differential across it proportional to the rate of flow, gas being admitted to the gas chamber through a restricted opening.

5. A gas pressure regulator according to claim 4, wherein the disc which constitutes the obturator encircles a bush through which the operating spindle between the diaphragm and the regulator valve closure member extends.

6. A gas pressure regulator according to claim 1, wherein the connection between the diaphragm and the operating spindle includes a spring loaded linkage able to "break" the connection by means of an overcenter trip action of the linkage when the gas pressure acting against the diaphragm exceeds a predetermined upper limit, the arrangement being such that upon tripping of the linkage, the cutoff closure member is moved to close the cutoff orifice.